United States Patent [19]

Konno

[11] Patent Number: 5,253,118
[45] Date of Patent: Oct. 12, 1993

[54] DISK SPEED CONTROLLER USING FIELD MEMORY READ/WRITE CYCLE WITH ADAPTIVE LOCK

[75] Inventor: Yoshikiyo Konno, Tokorozawa, Japan

[73] Assignee: Pioneer Electronic Corporation, Tokyo, Japan

[21] Appl. No.: 3,812

[22] Filed: Jan. 8, 1993

Related U.S. Application Data

[63] Continuation of Ser. No. 538,940, Jun. 15, 1990, abandoned.

[30] Foreign Application Priority Data

Jul. 11, 1989 [JP] Japan ................................. 1-179657

[51] Int. Cl.⁵ ............................................. H04N 5/95
[52] U.S. Cl. ................................... 360/10.1; 358/338; 360/36.1; 360/33.1; 369/50
[58] Field of Search .................. 369/50; 358/321, 322, 358/338; 360/10.1, 10.3, 33.1–36.1

[56] References Cited

U.S. PATENT DOCUMENTS

| | | | |
|---|---|---|---|
| 3,947,870 | 3/1976 | Yumde et al. | 358/312 |
| 4,371,899 | 2/1983 | Ceshkovsky et al. | 360/36.1 |
| 4,858,030 | 8/1989 | Oku et al. | 358/342 |
| 4,864,428 | 9/1989 | Kanamura | 358/321 |

Primary Examiner—Andrew L. Sniezek
Assistant Examiner—James T. Wilson
Attorney, Agent, or Firm—Wegner, Cantor, Mueller & Player

[57] ABSTRACT

An information record medium playback apparatus including a memory for writing in a demodulated video signal characterized in that it generates a field discrimination signal indicative of the positions on the time base of the odd and even fields of the demodulated video signal written in the memory and generates a read field signal indicative of the positions of the odd and even fields of the demodulated signals to be read out from the memory in accordance with a read timing signal and makes a time base adjustment of the demodulated video signal based on the phase difference between the positions on the time base indicated by the field discrimination signal and the read field signal.

2 Claims, 8 Drawing Sheets

Fig. 2 PRIOR ART

Fig. 3A PRIOR ART
FIELD DISCRIMINATION SIGNAL

Fig. 3B PRIOR ART
READ FIELD SIGNAL

DISK SPEED CONTROLLER USING FIELD MEMORY READ/WRITE CYCLE WITH ADAPTIVE LOCK

This application is a continuation of U.S. application Ser. No. 07/538,940 filed Jun. 15, 1990, now abandoned.

BACKGROUND OF THE INVENTION

1. Field of the Invention

The present invention relates to an information record medium playback apparatus for playing back an information record medium such as a video disk and a video tape.

2. Description of the Prior Art

In information record medium playback apparatuses, there are ones provided with a memory for storing one field or one frame of a video signal and adapted such that various modes for writing and reading information to and from such memory can be selected to have colorful trick plays, such as still picture reproduction, frame-by-frame or slow-speed reproduction, and multi-speed reproduction in which reproducing speeds are freely chosen, performed.

In such an information record medium playback apparatus, when the odd-even state of the field of the video signal written in the memory and the odd-even state of the field of the composite video signal to be newly generated are not in agreement, it is adapted such that a count correction circuit operates to have the reproduced lines on the television screen put in the right order. However, when the count correction circuit operates, the reproduced picture shifts by one line in the vertical direction, and therefore, when multi-speed reproduction or the like is made and disagreement between the odd-even states of the fields frequently occurs, it sometimes arises that the reproduced picture vertically fluctuates and the picture becomes objectionable for the television viewers.

OBJECT AND SUMMARY OF THE INVENTION

Accordingly, an object of the present invention is to provide an information record medium playback apparatus capable of suppressing fluctuation of the reproduced picture occurring at the time when a composite video signal is generated from picture data read out from the memory.

To achieve the above mentioned object, the present invention, in an information record medium playback apparatus including drive means for driving an information record medium with a record signal bearing video information recorded, demodulation means for reading the record signal from the information record medium thereby demodulating the video signal, sync separation means for separating a sync signal from the demodulated video signal, drive control means for supplying a phase difference signal between the sync signal and a reference signal with a predetermined frequency to the drive means, signal generation means for generating a write timing signal based on the sync signal, write means for having the demodulated video signal stored in a memory in synchronism with the write timing signal, read timing generation means for generating a read timing signal, and read means for reading the demodulated video signal written in the memory in accordance with the read timing signal, comprises field discrimination means for generating a field discrimination signal indicative of the positions on the time base of the odd and even fields of the demodulated video signal written in the memory, read field signal generation means for generating a read field signal indicative of the positions on the time base of the odd and even fields of the demodulated video signal to be read out of the memory in accordance with the read timing signal, and time base adjustment means for making time base adjustment of the demodulated video signal based on the phase difference between positions on the time base indicated by the field discrimination signal and the read field signal.

According to the information record medium playback apparatus with the described arrangement, when oddness/evenness of the field of the demodulated video signal written in the memory and the oddness/evenness of the field of the video signal to be generated by being read from the memory are not in agreement, the time base of the demodulated video signal is adjusted and thereby oddness/evenness of both the written field and the read field is controlled to agree with each other.

DETAILED DESCRIPTION OF THE PREFERRED EMBODIMENT

Before entering into description of an embodiment of the present invention, a prior art information record medium playback apparatus will be described with reference to the accompanying drawings.

Figure 1:
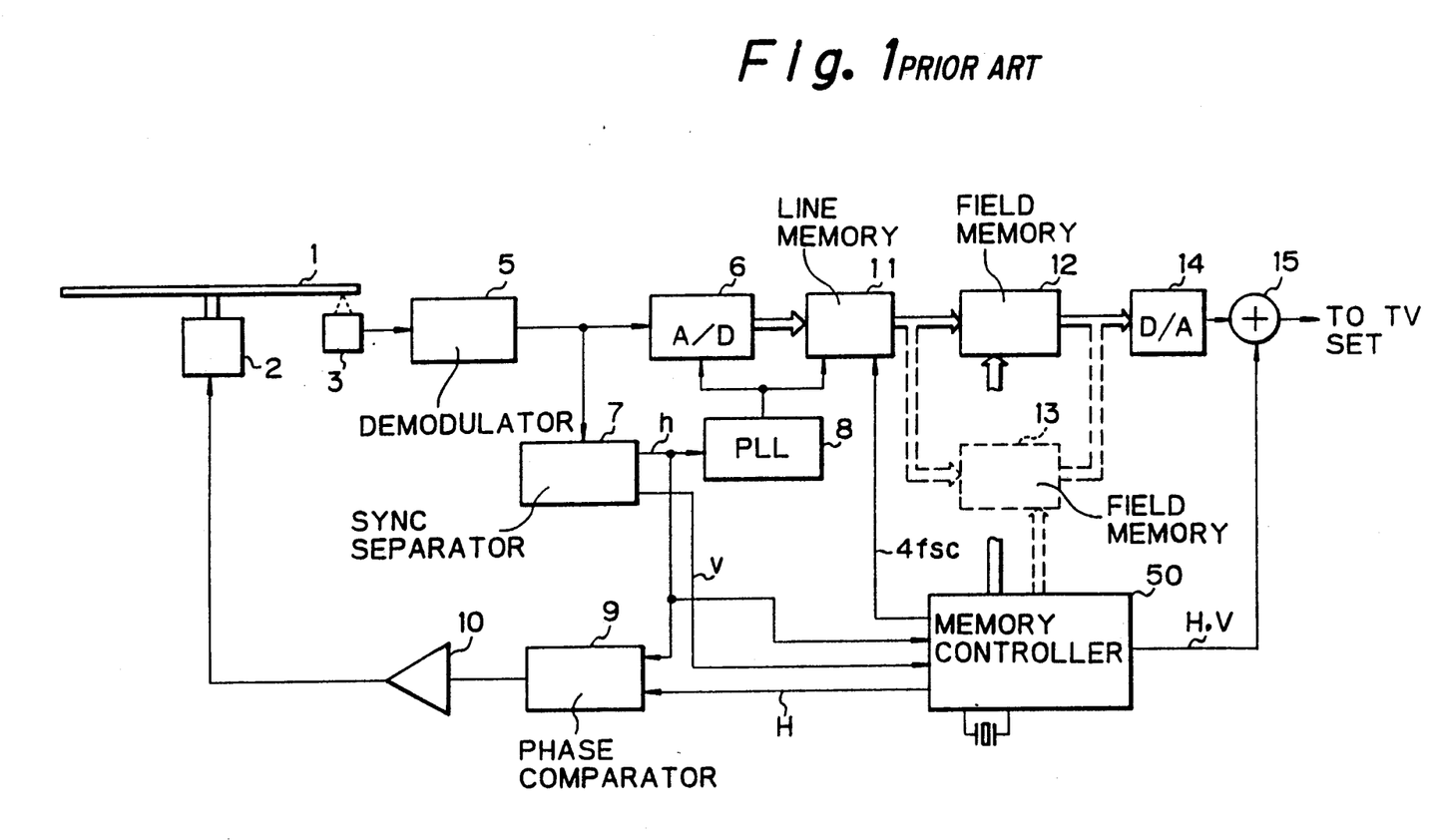
FIG. 1 is a block diagram showing a prior art example.

FIG. 1 is a block diagram showing a prior art example of a video disk player, in which a disk 1 with a signal bearing video information recorded is rotated by a spindle motor 2. As the disk 1 is rotated, the signal recorded in the disk 1 is read by a pickup 3. An RF signal output from the pickup 3 is supplied to a demodulator 5 formed of an FM demodulator or the like. By this demodulator 5 is demodulated a video signal and it is supplied to an A/D (analog-to-digital) converter 6 and a sync separator 7. In the sync separator 7, a horizontal sync signal h and a vertical sync signal v are separated from the video signal. The horizontal sync signal h is supplied to a PLL circuit 8 for generating a write clock, a phase comparator 9 for controlling the rotation of the spindle motor 2, and a memory controller 50. The vertical sync signal v is supplied to the memory controller 50.

The phase comparator 9 compares the relative phase between the demodulated horizontal sync signal h and a reference horizontal sync signal H supplied from the memory controller 50 and generates a level signal dependent on the phase difference between these signals. The level signal is supplied as a spindle error signal to the spindle motor 2 through a servo amplifier 10, and thereby, the rotating speed of the disk 1 is controlled.

The PLL circuit 8, constituted of a phase-locked loop formed, for example, of a phase comparator, VCO, and frequency divider, generates a timing signal 4fsc, which is in synchronism with the horizontal sync signal h and has, as the center frequency, a frequency 4 fsc, four times as large as the color subcarrier frequency fsc, and supplies the timing signal to the A/D converter 6 and a 1H line memory 11. The A/D converter 6 performs sampling of the video signal based on the aforesaid timing signal, converts the sampled values into digital data, and supplies the data to the line memory 11.

The line memory 11 has the capacity to store, for example, one-line data. The line memory 11 writes the output data from the A/D converter 6 based on the aforesaid timing signal 4fsc, which follows the variations in the time base of the video signal, and on the other hand, outputs the stored data based on the real signal at the fixed frequency 4fsc supplied from the memory controller 50. Thus, fine adjustments of the time base variations are performed and jitters are absorbed by the line memory 11.

The data read out of the line memory 11 are supplied to field memories 12 and 13. The field memories 12 and 13 each have one-field storage capacity and write and read data in response to various control signals supplied from the memory controller 50. By means of the memories, trick plays can be achieved not only with a CAV disk but also with a CLV disk.

In the manners of use of the memory, there is a field memory mode using only one field memory 12 and a frame memory mode using both of the field memories 12 and 13. For example, in still picture reproduction, the frame memory mode is used to store the video signal for one frame and read the data so that the quality of the reproduced picture is prevented from lowering.

Data read out of the field memory 12 or 13 is converted by a D/A (digital-to-analog) converter 14 into an analog signal. On this analog signal is superposed a sync signal supplied from the memory controller 50 in an adder 15, whereby a composite video signal is reproduced to be supplied to a television receiver, not shown.

Figure 2:
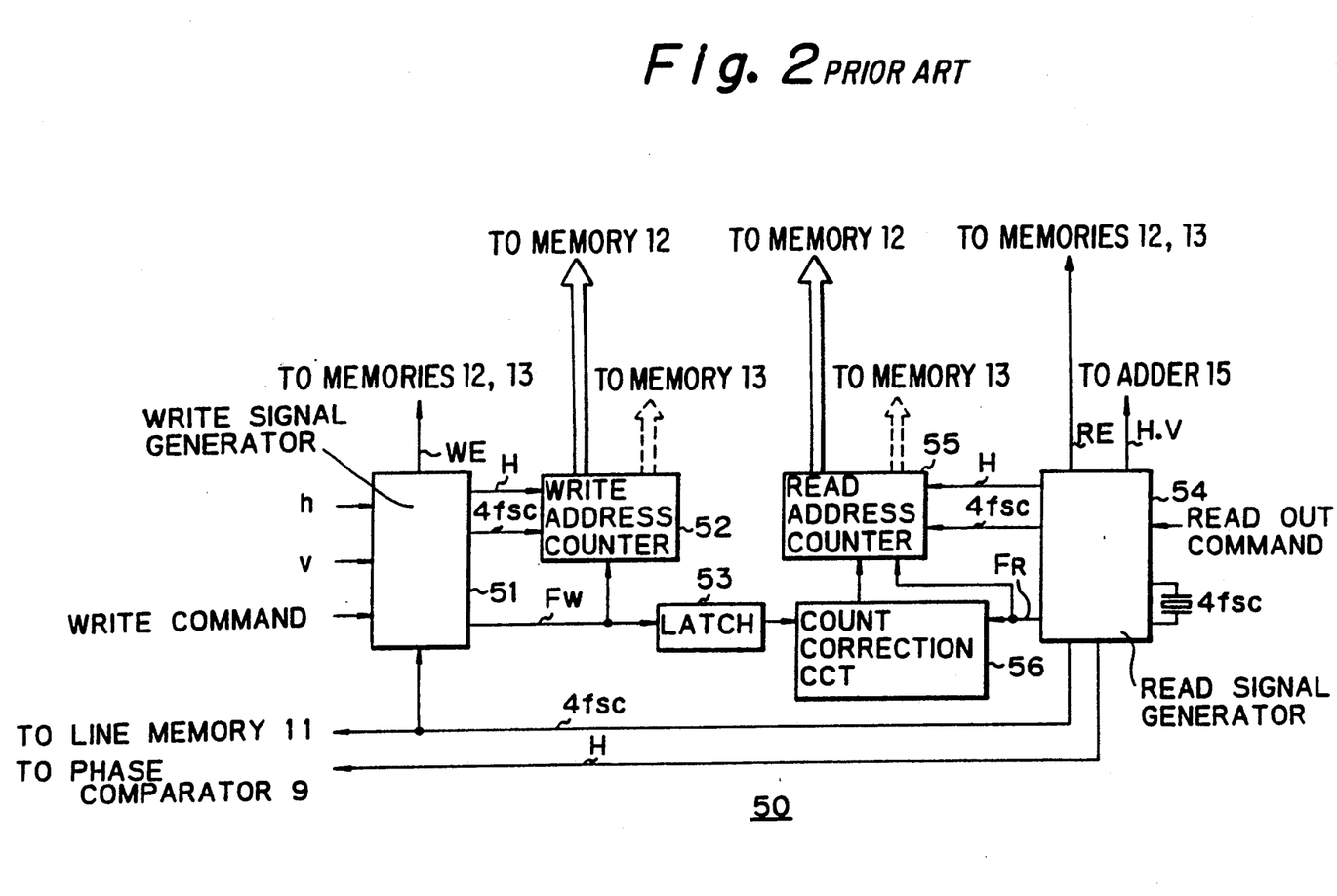
FIG. 2 is a block diagram showing an example of structure of the memory controller 50 shown in FIG. 1.

The memory controller 50 is formed, for example, of a writer signal generator 51, write address counter 52, latch 53, read signal generator 54, read address counter 55, count correction circuit 56, etc. as shown in FIG. 2.

Figure 3A:
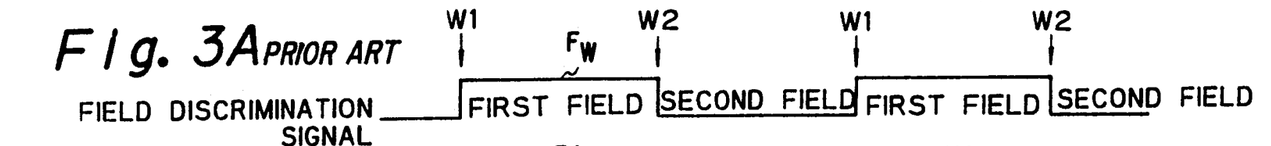
FIG. 3A and FIG. 3B are drawings for explaining the prior art example.

The write signal generator 51 has a field detection portion for performing memory address controlling so that a video signal may be stored for each field or frame. The field detection portion discriminates between an odd field and an even field of the video signal supplied to the memory based on the horizontal sync signal h and vertical sync signal v separated from the demodulated video signal, generates a field discrimination signal $F_W$ which, as shown in FIG. 3A, goes high when an odd field is detected and goes low when an even field is detected, and supplied the signal to the write address counter 52 and the latch 53. The write signal generator 51 also generates a horizontal sync signal H by frequency dividing a reference signal 4fsc, four times as large as the color subcarrier, supplied from a quartz oscillator incorporated in the write address counter 52 and, in response to an external write command, supplies the signal H together with the signal 4fsc to the write address counter 52.

The write address counter 52 is formed of an odd field address counter and an even field address counter. The odd field address counter specifies the storage address of each picture element of the odd field picture made up of 1H to 263H of a video signal. The even field address counter specifies the storage address of each picture element of the odd field picture made up of 264H to 525H of a video signal.

In the frame memory mode, the cumulative value in the odd field address counter is supplied to the memory 12 and the cumulative value in the even field address counter is supplied to the memory 13.

The odd field address counter starts counting the signal H and the signal 4fsc upon arrival of the starting position W1 of an odd field of the field discrimination signal $F_W$ shown in FIG. 3A and specifies two-dimensional address positions on the memory 12 at which the picture element data are to be stored, by both cumulative values of the signal H and the signal 4fsc. The even field address counter starts counting the signal H and the signal 4fsc upon arrival of the starting position W2 of an even field of the field discrimination signal $F_W$ shown in FIG. 3A and specifies two-dimensional address positions on the memory 13 at which the picture element data are to be stored, by both cumulative values of the signal H and the signal 4fsc.

Thus, in the frame memory mode, a 263-H portion of the video signal (the first field) is stored in the memory 12 and a 262-H portion of the video signal (the second field) is stored in the memory 13.

In the field memory mode, only the odd field address counter and the memory 12 are used. In this case, the odd field address counter starts counting the signal H and the signal 4fsc over and again in response to arrival of each of the starting positions W1 of the odd field and the starting position W2 of the even field of the field discrimination signal $F_W$ and specifies the two-dimensional address positions on the memory at which the picture data are to be stored, by both cumulative values of the signal H and the signal 4fsc.

Thus, in the field memory mode, a 263-H portion and a 262-H portion of the video signal are alternately stored in the memory 12.

The read signal generator 54 performs such operations as frequency dividing of the signal 4fsc from the quartz oscillator incorporated therein and generates a signal H for a horizontal period, a signal V for a vertical period, an equalizing pulse, a read field signal $F_R$, etc. The read signal generator 54 supplies the signal H and the signal 4fsc for specifying the read address to the read address counter 55, the sync signal formed of the signal H, signal V, equalizing pulse, etc. for generating a new composite video signal to the adder 15, the signal H for spindle servo to the phase comparator 9, and the read field signal $F_R$ indicating whether the composite video signal newly generated from the video signal read out from the memory is that of an odd field or an even field to the count correction circuit 56 and the read address counter 55. The read field signal, as shown in FIG. 3B, goes high when the composite video signal generated at the output of the adder 15 is that of an odd field and goes low when it is of an even field.

The read address counter 55 is formed of an odd field address counter and an even field address counter and operates similarly to the write address counter 52.

That is, in the frame memory mode, the cumulative value in the odd field address counter is supplied to the memory 12 and the cumulative value in the even field address counter is supplied to the memory 13.

Figure 3B:
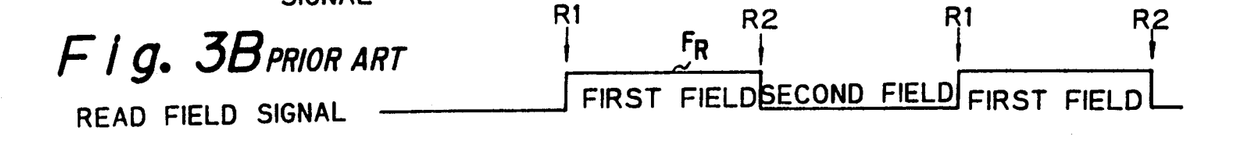

The odd field address counter starts counting the signal H and the signal 4fsc upon arrival of the starting position R1 of an odd field of the read field signal $F_R$ shown in FIG. 3B and specifies two-dimensional address positions on the memory from which the picture element data are to be read out, by both cumulative values of the signal H and the signal 4fsc. The even field address counter starts counting the signal H and the signal 4fsc upon arrival of the starting position R2 of an even field of the read field signal $F_R$ shown in FIG. 3B and specifies two-dimesional address positions on the memory from which the picture element data are to be read out, by both cumulative values of the signal H and the signal 4fsc.

Thus, in the frame memory mode, a 263-H portion of the video signal is read out from the memory 12 and a 262-H portion of the video signal is read out from the memory 13.

In the field memory mode, only the odd field address counter and the memory 12 are used. In this case, the odd field address counter starts counting the signal H and the signal 4fsc over and again in response to arrival of each of the starting position R1 of the odd field and the starting position R2 of the even field of the read field signal $F_R$ and specifies the two-dimensional address positions on the memory from which the picture data are to be read out, by both cumulative values of the signal H and the signal 4fsc.

Thus, in the field memory mode, a 263-H portion and a 262-H portion of the video signal are alternately read out from the memory 12.

The count correction circuit 56 compares the content of the latch circuit 53 retaining the data indicating whether the field last written in the memory was an odd field or an even field and the current read field signal $F_R$, and thereby, it detects whether or not the kind of the field (whether an odd or an even field) of the composite video signal to be generated at the output terminal of the adder 15 and the kind of the field of the video signal to be read from the memory are in agreement. When the kinds of these fields are in agreement, the read address counter 55 does not make any correction since the original composite video signal can be correctly generated. When the kinds of these fields are not in agreement, it corrects the cumulative value in the read address counter by adding or subtracting the value for 1H to or from the same.

The correction is made because, if it is not made, a video signal for an even field read from the memory will be inserted into the odd field of a composite video signal to be newly generated, for example, and when the thus generated composite signal is supplied to the television receiver to be reproduced, a picture in which the order of frames is wrong is reproduced. To prevent this, when the kinds of these signals are not in agreement, the cumulative value in the read address counter 55 is increased or decreased by the value corresponding to a 1H portion so that the order of reproduced lines on the television screen is put in the right order.

Figure 4A:
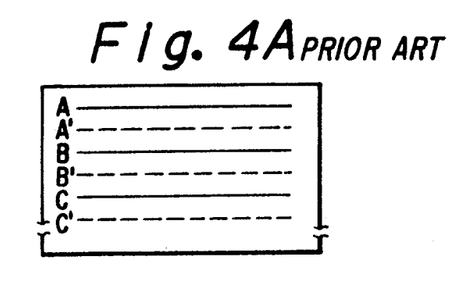
FIGS. 4A to 4C are drawings for explaining examples of reproduced picture on a television receiver.
Figure 4B:
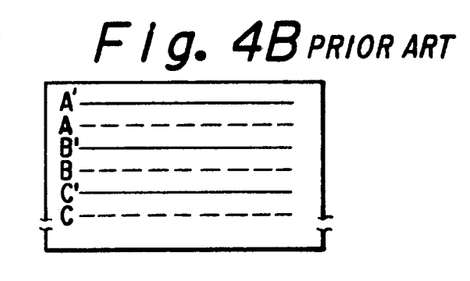

In other words, while, in an ordinary television receiver, one frame (one picture) is formed of an odd field indicated by full lines in FIG. 4A and an even field indicated by broken lines therein, if the field of the video signal read out from the memory and the field of the generated composite signal are not in agreement, the lines along which the video signals are displayed slip off and the lines A, B, C of the odd field and the lines A', B', C' of the even field come in the wrong order as shown in FIG. 4B.

Figure 4C:
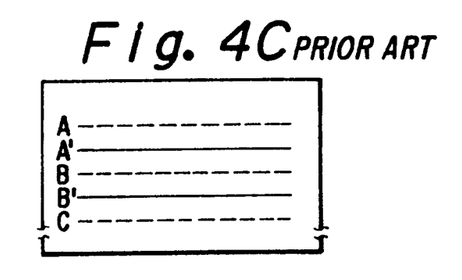

Therefore, in such case, the cumulative value in the read address counter 55 is corrected by the amount corresponding to 1H so that the display may be made in the right order as shown in FIG. 4C.

With the described arrangement, still picture reproduction is achieved this way: under a write command, a first field of the video signal is written in the memory 12 and a second field is written in the memory 13 upon arrival of a position W1 and a position W2 of the field discrimination signal, and thereafter, the write operation in the memory is inhibited by a later described signal WE, and then, under a read command, read operations of one frame video signal from the field memories 12 and 13 are repeated upon arrival of the positions R1 and R2 of the read field signal.

Multi-speed reproduction is made this way: while the above described still-picture reproduction is performed, the pickup is caused to make track jumping of the information read points or skip over predetermined tracks, followed by reading out of a new one-field portion of the video signal and writing it into the memory so that the contents of the memory are updated. By so doing, the composite signal reproduced from the memory becomes equivalent to that obtained when the original video signal is displayed frame by frame and thus picture reproduction at desired playback speeds can be achieved.

As described above the count correction circuit 56, when the odd-even state of the field of the video signal written in the memory and the odd-even state of the field of the composite video signal to be newly generated are not in agreement, operates so that the reproduced lines on the television screen are put in the right order. However, when the count correction circuit 56 operates, the reproduced picture vertically shifts by one line as shown in FIG. 4C.

Therefore, when multi-speed reproduction or the like is made and disagreement in the odd-even states of the fields occurs frequently, sometimes it arises that the reproduced picture fluctuates in the vertical direction and it becomes an objectionable picture for the television viewers.

An embodiment of the present invention will be described below with reference to FIG. 5. In the apparatus shown in FIG. 5, like parts to those in the apparatus shown in FIG. 1 are denoted by corresponding reference numerals and, hence, explanation of the same will be omitted.

In the present embodiment, a phase comparator 71, an adder 72, and a lock detector 73 are increased.

Figure 5:
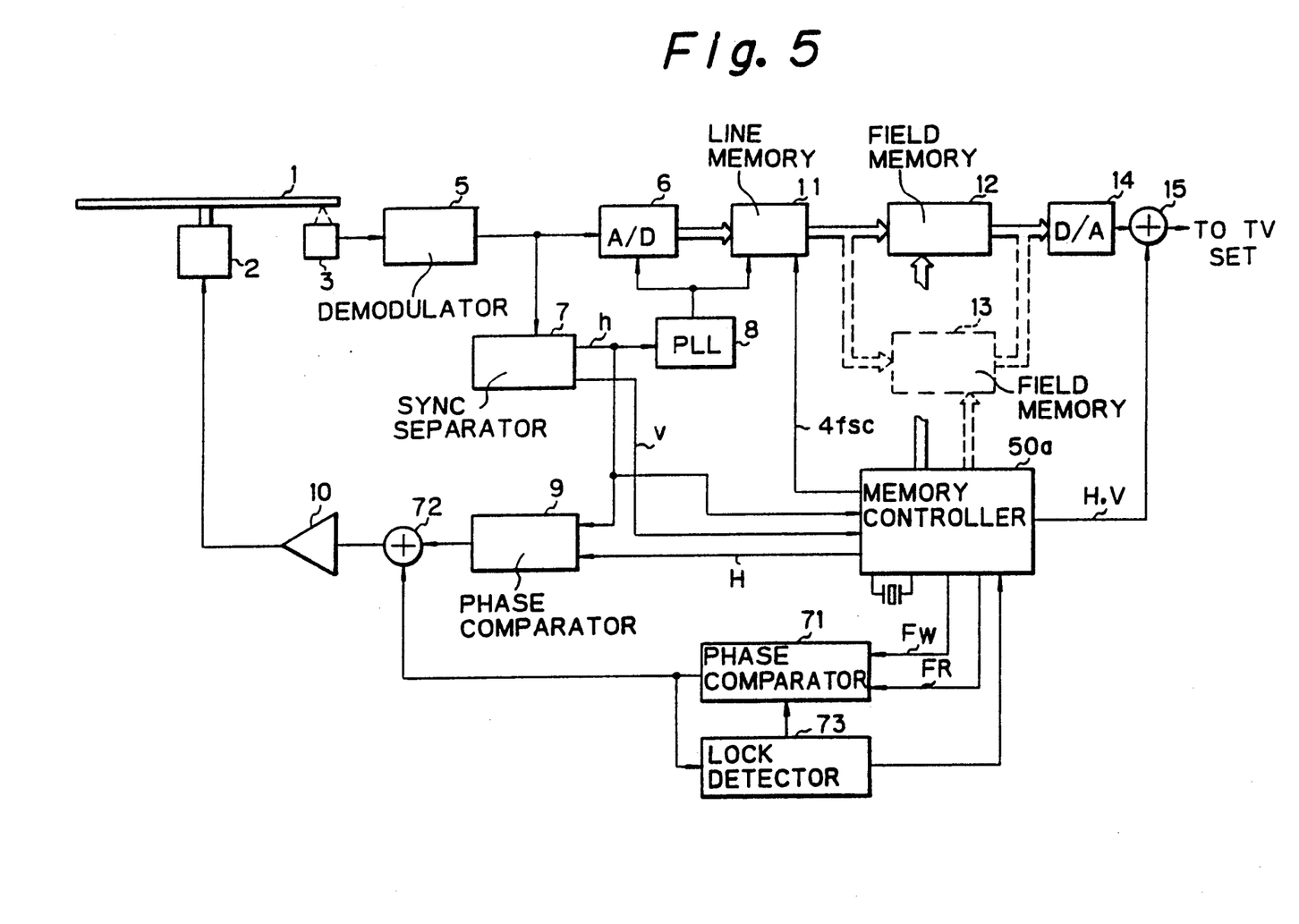
FIG. 5 is a block diagram showing an embodiment of the present invention.

Referring to FIG. 5, a field discrimination signal $F_W$ and a read field signal $F_R$ are supplied from the memory controller 50a to the phase comparator 71. The phase comparator 71 compares, for example, the position of the leading edge or trailing edge of the field discrimination signal $F_W$ and the position of the leading edge or trailing edge of the read field signal $F_R$ and supplies a sub-phase difference signal having a level corresponding to the time difference between the two positions to one input of the adder 72. The other input terminal and the output terminal of the adder 72 are respectively connected with the output of the phase comparator 9 and the input of the servo amplifier 10. The adder 72 superposes the sub-phase difference signal on the phase difference output of the phase comparator 9. The servo amplifier 10 regulates the speed of the spindle motor 2 according to the sub-phase difference signal thereby adjusting the time base of the video signal to be demodulated. The phase comparator 71, when the result of the comparison is a predetermined value within one field, for example, when the read field signal $F_R$, ideally, rises virtually at the half-field position of the first field of the field discrimination signal $F_W$ as shown in FIG. 3A and FIG. 3B, brings the level of the sub-phase difference signal to zero. When the level of the sub-phase difference signal is brought virtually to zero, the lock detector 73 detects it and generates a lock detection signal at high level. The lock detection signal is supplied to the memory controller 50a.

Figure 6:
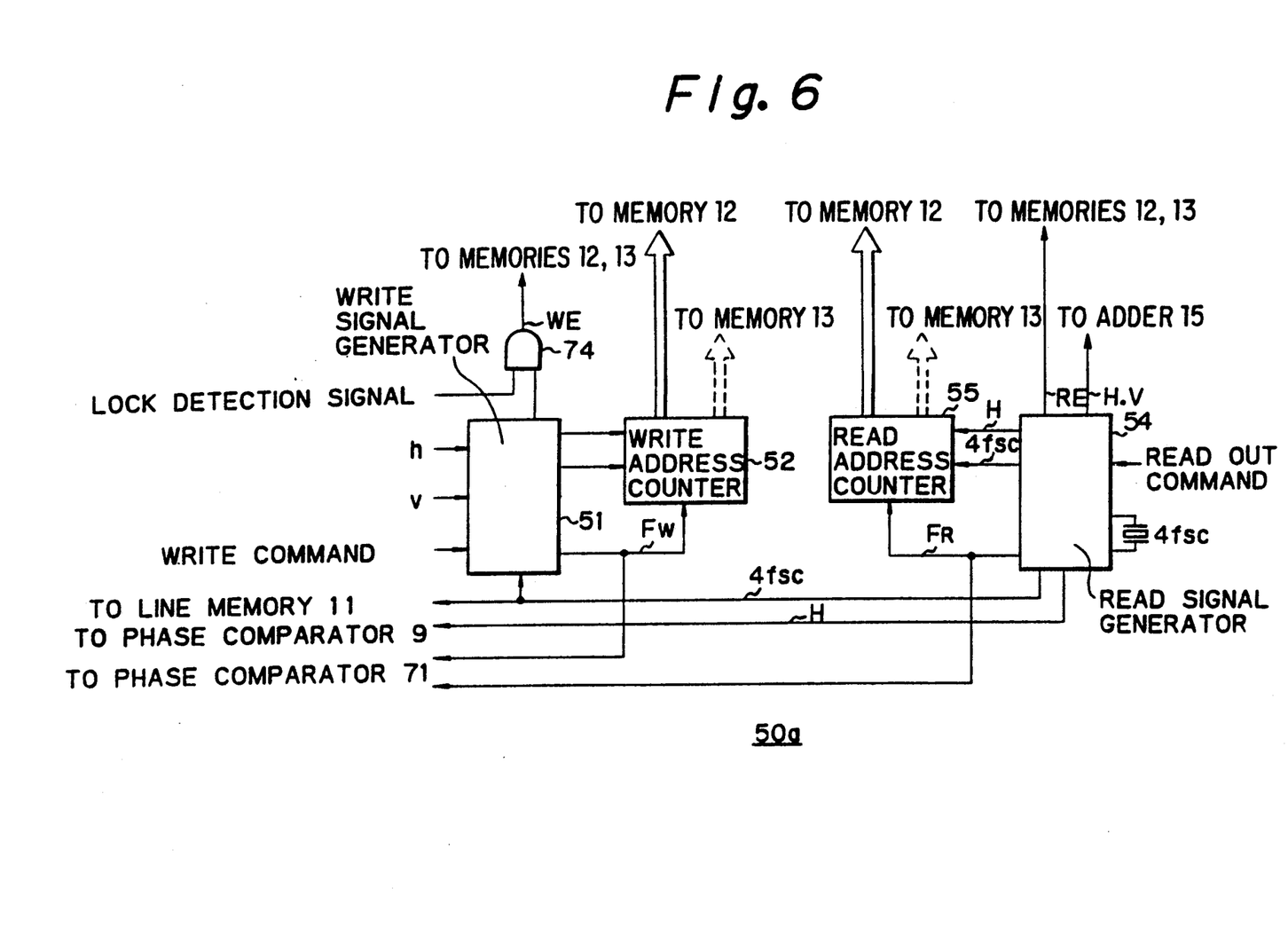
FIG. 6 is a block diagram showing an example of structure of the memory controller 50a shown in FIG. 5.

FIG. 6 shows an example of structure of the memory controller 50a, in which like parts to those in the memory controller 50 shown in FIG. 2 are denoted by corresponding reference numerals and, hence, explanation of the same will be omitted.

The memory controller 50a has an AND gate 74 but it has neither latch 53 nor count correction circuit 56. Otherwise, its structure is the same as that of the memory controller 50.

The lock detection signal is supplied to one input terminal of the AND gate 74. The other input terminal of the AND gate 74 is supplied with a right enable signal WE from the write signal generator 51, and the output of the AND gate is supplied to the memories 12 and 13. Thus, since the write enable signal WE allowing writing in the memory is supplied to each memory after the lock detection has been made, it is ensured that the video signal is allowed to be written in the memory after the state where the write field and the read field are in agreement has been brought about. Other structure of the present embodiment is the same as that of the apparatus shown in FIG. 1.

Figure 7A:
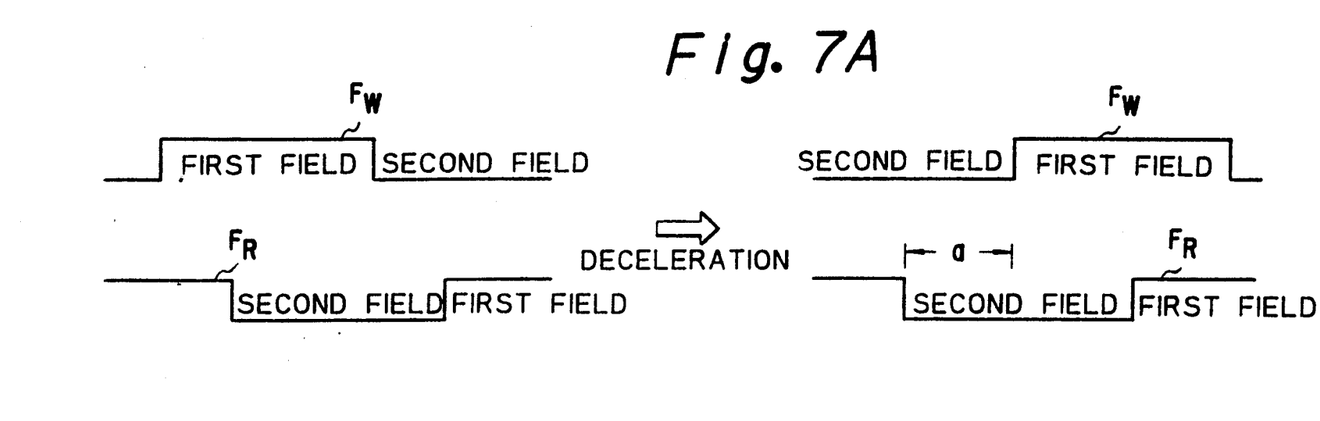
FIG. 7A and FIG. 7B are drawings for explaining operation of the embodiment.

FIG. 7A shows a case where the time base of the field discrimination signal is ahead of the time base of the read field signal, in which case, an adjustment is made by decelerating the spindle motor so that the phase difference between these signals may become greater than 1H and smaller than 1V (one field), because there is practically no problem if the phase deference is within that range.

Figure 7B:
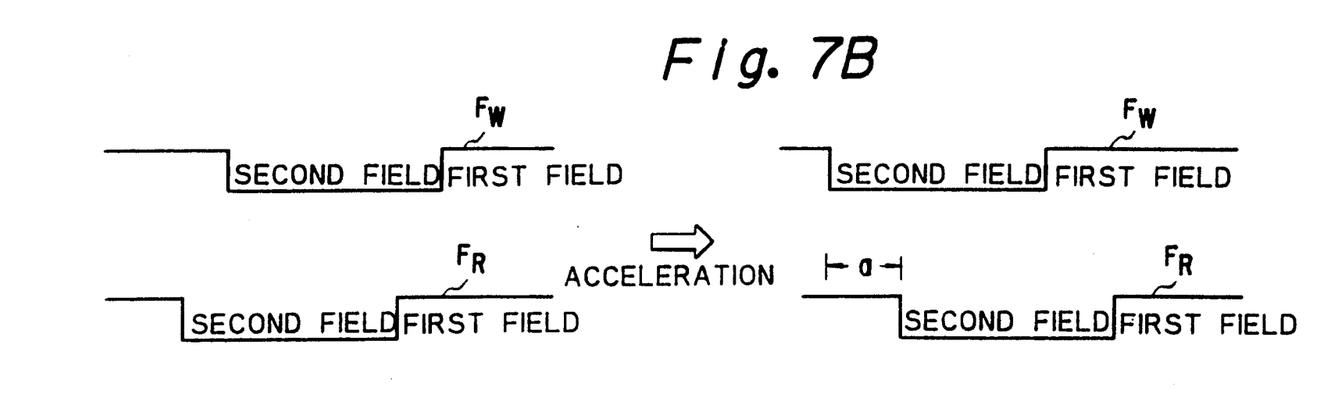

FIG. 7B shows a case where the time base of the field discrimination signal is behind the time base of the read field signal, in which case, an adjustment is made by accelerating the spindle motor so that the phase difference between these signals may become greater than 1H and smaller than 1V (one field).

Figure 8:
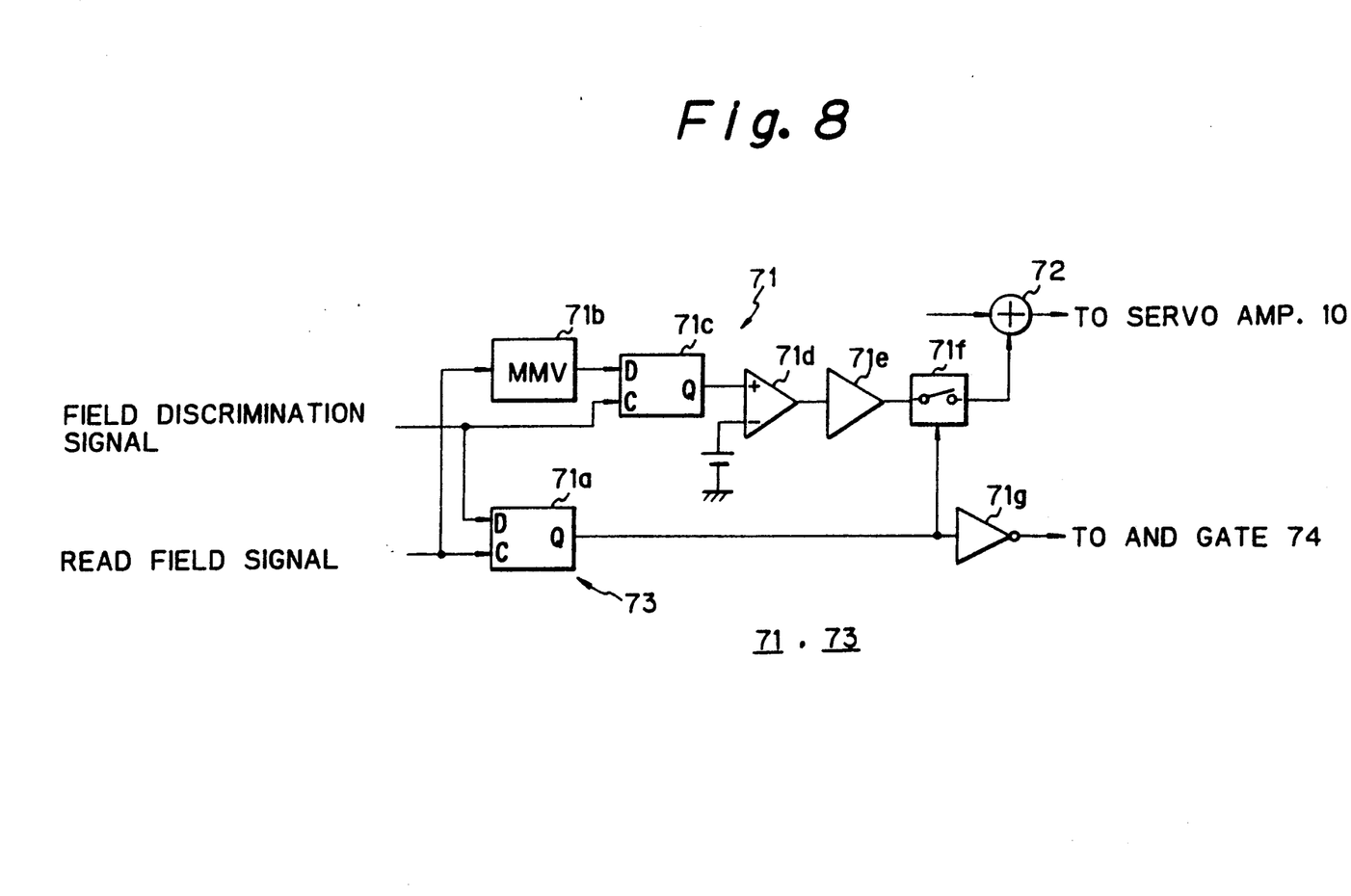
FIG. 8 is a block diagram showing examples of structure of a phase comparator 71 and a lock detector 73.

FIG. 8 shows an example of structure of the phase comparator 71 and the lock detection circuit 73. Operation of this example will be described below with reference to FIGS. 9A to 9F.

Figure 9A:
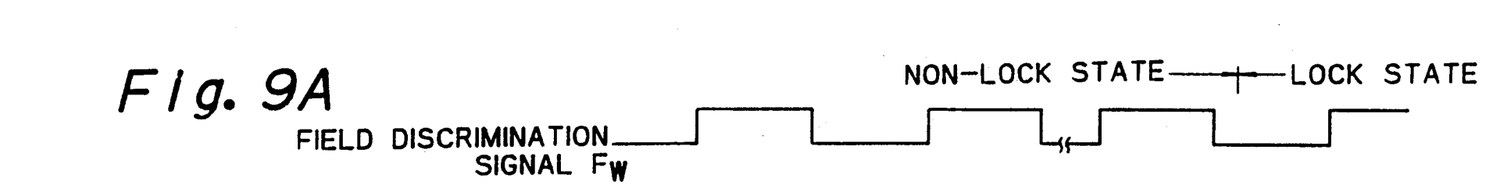
FIGS. 9A to 9F are drawings for explaining operation of various circuits shown in FIG. 8.
Figure 9B:
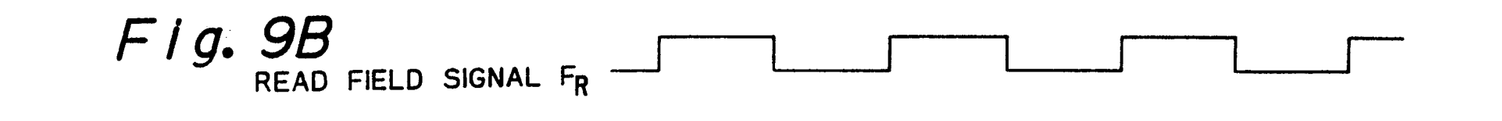
Figure 9C:
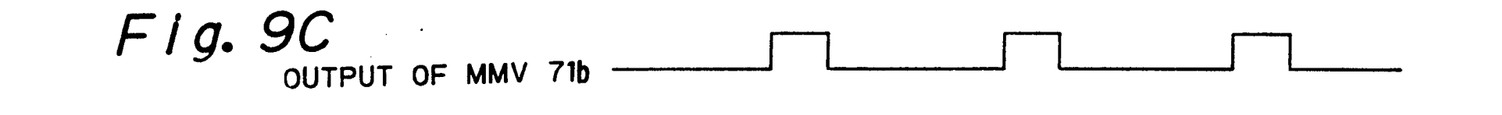
Figure 9D:
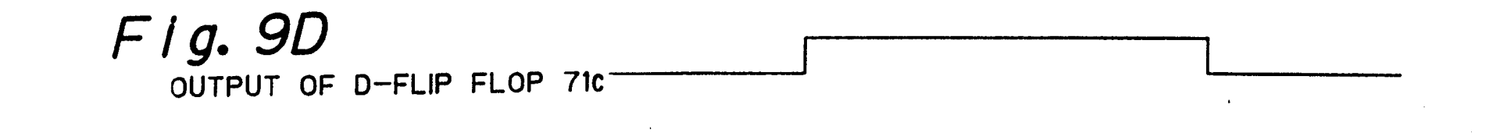
Figure 9E:
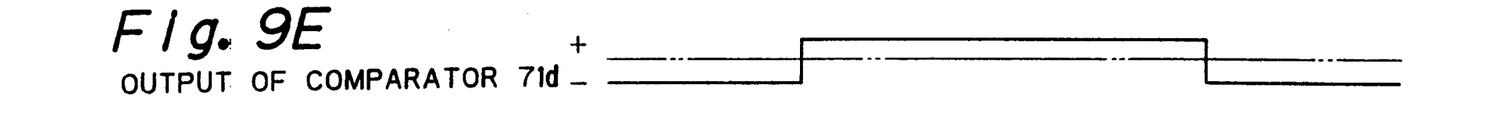

In the structure of FIG. 8, a field discrimination signal as shown in FIG. 9A is supplied to the D input of the D flip-flop 71a and the clock input of the D flip-flop 71c. A read field signal as shown in FIG. 9B is supplied to the clock input of the D flip-flop 71a and the trigger input of the monostable multivibrator 71b. The monostable multivibrator 71b generates a pulse which is held high for a "¼ field period" (hereinafter, to be briefly expressed as "¼V") after it has gone high at the timing of the trailing edge of the read field signal as shown in FIG. 9C and supplies this pulse to the D input of the D flip-flop 71c. The Q output of the D flip-flop 71c goes high when the trailing edge of the field discrimination signal is within ¼V of the trailing edge of the read field signal as shown in FIG. 9D. This Q output is supplied to the comparison input of the level comparator 71d. The level comparator 71d, with a predetermined voltage impressed on its reference input, is adapted to generate a positive voltage when the Q output is high thereby accelerating the spindle motor 2 at the subsequent stage, and generate a negative voltage when the Q output is low thereby decelerating the spindle motor 2. The voltage output of the level comparator 71d as shown in FIG. 9E is supplied to the adder 72 inserted in the spindle servo loop, through a buffer amplifier 71e and a delay switch 71f. The circuit 71b-71f constitute the phase comparator 71.

Figure 9F:
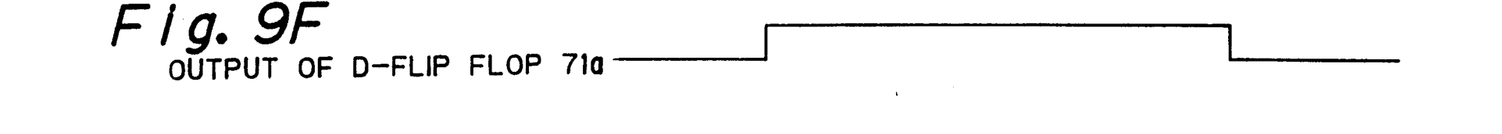

The flip-flop 71a performs the function of the lock detector 73 and, as shown in FIG. 9F, generates a lock detection signal when the field discrimination signal is low at the timing of the trailing edge of the read field signal and generates a non-lock detection signal when the same is high, and supplies the generated signal to the control input of the relay switch 71f and an inverter 71g. The relay switch 71f responsive to the non-lock detection signal relays the output of the buffer amplifier 71e to the adder 72 so that the error in the spindle servo loop is increased and the position on the time base of the demodulated video signal is changed. The output of the inverter 71g is supplied to the AND gate 74, whereby the supply of the signal WE to the memory in a non-lock state is prevented.

When the time base of the demodulated video signal is adjusted and the lock state is brought about, the relay switch 71f is opened and a normal spindle servo state is brought about and the signal WE is supplied to the memory so that writing in the memory is enabled.

Thus, in either frame memory mode or the field memory mode, the field of the video signal written in the memory and the field of the video signal read out from the memory are brought into agreement and, hence, the necessity for the correction of the count value of the read address in the prior art apparatus can be eliminated and occurrence of the fluctuation of the picture due to the correction of the count can be prevented.

Although the above description has been made as to an apparatus for playing back a disk with a video signal recorded, the present invention can be applied also to a VTR or the like which plays back a tape with a video signal recorded.

In the information record medium playback apparatus of the present invention, as described in the foregoing, when a video signal demodulated from an information record medium is once stored in a memory and, thereby, various trick plays are made, the time base of the video signal written in the memory is adjusted so that the kind of the field (whether and odd field or an even field) written in the memory and that of the field of the video signal generated by being read from the memory are brought into agreement, the need for correction of the reading address count can be eliminated and a merit is obtained that the vertical fluctuation of the reproduced picture on the television screen due to the count correction is prevented from occurring.

What is claimed is:

1. An information record medium playback apparatus comprising:

drive means for driving an information record medium with a record signal bearing video information recorded;

read means for reading said record signal from said information record medium;

demodulation means for demodulating a video signal from the read signal by said read means;

sync separation means for separating a sync signal from said demodulated video signal;

drive control means for supplying a first phase difference signal between said sync signal and a reference signal with a predetermined frequency to said drive means, said drive control means including means for generating said reference signal and first phase difference detection means for generating said first phase difference signal by comparing phases of said sync signal and said reference signal;

signal generation means for generating a write timing signal based on said sync signal;

write means for having said demodulated video signal stored in a memory in synchronism with said write timing signal;

read timing generation means for generating a read timing signal;

read means for reading the demodulated video signal written in said memory in accordance with said read timing signal;

field discrimination means for generating a field discrimination signal indicative of the positions on the time base of the odd and even fields of the demodulated video signal written in said memory;

read field signal generation means for generating a read field signal indicative of the positions on the time base of the odd and even fields of the demodulated video signal to be read out of said memory in accordance with said read timing signal; and time base adjustment means for performing time base adjustment of said demodulated video signal, said time base adjustment means including second phase difference detection means for detecting a phase difference between said position on the time base indicated by said field discrimination signal and said position on the time base indicated by said read field signal and generating a second phase difference signal, and means, responsive to said second phase difference signal, for accelerating or decelerating a driving speed of said information record medium by said drive means when the phase difference between positions on the time base indicated by said field discrimination signal and said read field signal is not in a predetermined phase difference range, wherein said field discrimination signal has levels respectively corresponding to the periods during which the odd and even fields remain in existence and said read field signal has levels respectively corresponding to the periods during which the odd and even fields remain being read, and wherein said means for accelerating or decelerating driving speed included in said time base adjustment means comprises an adder for superposing said second phase difference signal on said first phase difference signal generated by said first phase difference detection means of said drive control means.

2. An information record medium playback apparatus according to claim 1, further comprising means for judging a condition that said phase difference indicated by said second phase difference signal is within one field period, and means for rendering, when said phase difference is within one field period, the level of said second phase difference signal produced by said second phase difference detection means equal to zero so that said memory stores one field of said demodulated video signal.

* * * * *